(12) United States Patent
Yoo et al.

(10) Patent No.: US 12,436,441 B2
(45) Date of Patent: Oct. 7, 2025

(54) SILICON PHOTONICS-BASED OPTICAL MODULATION DEVICE WITH TWO METAL LAYERS

(71) Applicant: ELECTRONICS AND TELECOMMUNICATIONS RESEARCH INSTITUTE, Daejeon (KR)

(72) Inventors: Sanghwa Yoo, Daejeon (KR); Heuk Park, Daejeon (KR); Joon Ki Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 376 days.

(21) Appl. No.: 18/142,752

(22) Filed: May 3, 2023

(65) Prior Publication Data

US 2023/0358955 A1 Nov. 9, 2023

(30) Foreign Application Priority Data

May 4, 2022 (KR) .......................... 10-2022-0055279

(51) Int. Cl.
*G02F 1/225* (2006.01)
*G02B 6/12* (2006.01)

(52) U.S. Cl.
CPC ....... *G02F 1/2257* (2013.01); *G02B 6/12002* (2013.01); *G02F 1/2255* (2013.01); *G02B 2006/12142* (2013.01)

(58) Field of Classification Search
CPC ...... G02B 6/12002; G02B 2006/12142; G02F 1/025; G02F 1/035; G02F 1/2255; G02F 1/2257; G02F 2201/127; G02F 2203/50

(Continued)

(56) References Cited

U.S. PATENT DOCUMENTS 6,877,912 B2 4/2005 Cho et al.
7,424,180 B2 9/2008 Park et al.
(Continued)

FOREIGN PATENT DOCUMENTS

JP 2016-033585 A 3/2016
JP 2018-105975 A 7/2018
(Continued)

OTHER PUBLICATIONS

Nan Qi et al.; "Co-Design and Demonstration of a 25-Gb/s Silicon-Photonic Mach-Zehnder Modulator With a CMOS-Based High-Swing Driver", IEEE Journal of Selected Topics in Quantum Electronics, vol. 22, No. 6, Nov./Dec. 2016.

*Primary Examiner* — Robert Tavlykaev
(74) *Attorney, Agent, or Firm* — LRK PATENT LAW FIRM

(57) ABSTRACT

According one embodiment of the present disclosure, there is provided a silicon photonics-based optical modulation device having two metal layers. The optical modulation device includes a phase shifter, a ground unit, and a pad unit. The phase shifter includes a first signal electrode, a second signal electrode, and at least two ground electrodes formed in a first metal layer. The phase shifter includes two silicon optical waveguides. The ground unit is formed in a second metal layer different from the first metal layer. The pad unit is formed in the second metal layer, provided with a first local area electrically connected to the ground unit, and electrically connected to the first signal electrode and the second signal electrode via a second local area thereof electrically isolated from the ground unit.

18 Claims, 15 Drawing Sheets

(58) Field of Classification Search
USPC .................................................. 385/1–3, 14
See application file for complete search history.

(56) References Cited

U.S. PATENT DOCUMENTS

| | | | |
|---|---|---|---|
| 9,454,059 | B1 | 9/2016 | Nagarajan |
| 9,508,662 | B2* | 11/2016 | Kunishima .......... H05K 1/0296 |
| 10,831,044 | B1 | 11/2020 | Doerr |
| 10,895,681 | B2* | 1/2021 | Watanuki ................. G02B 6/12 |
| 11,164,893 | B1* | 11/2021 | Sonkoly ............ H01L 21/76264 |
| 11,740,533 | B2* | 8/2023 | Poulin .................... G02F 1/2255 |
| | | | 385/2 |
| 12,339,529 | B2* | 6/2025 | Ichimei ................. G02F 1/0102 |
| 2016/0377892 | A1* | 12/2016 | Jou ....................... G02F 1/0121 |
| | | | 385/3 |
| 2018/0102847 | A1 | 4/2018 | Kim et al. |
| 2018/0180965 | A1 | 6/2018 | Goi |
| 2020/0166720 | A1* | 5/2020 | Charles ................ G02B 6/4245 |
| 2020/0225556 | A1* | 7/2020 | Hayashi .................. G02F 1/017 |
| 2022/0342241 | A1* | 10/2022 | Miyazaki ............. G02F 1/0327 |

FOREIGN PATENT DOCUMENTS

| | | |
|---|---|---|
| KR | 10-2005-0086926 A | 8/2005 |
| KR | 10-1070409 B1 | 10/2011 |
| KR | 10-2018-0039948 A | 4/2018 |
| KR | 10-2019-0089691 A | 7/2019 |
| KR | 10-2021-0031346 A | 3/2021 |
| WO | 2004/061523 A1 | 7/2004 |

* cited by examiner

<prior art>

<prior art>

<prior art>

Fig. 13
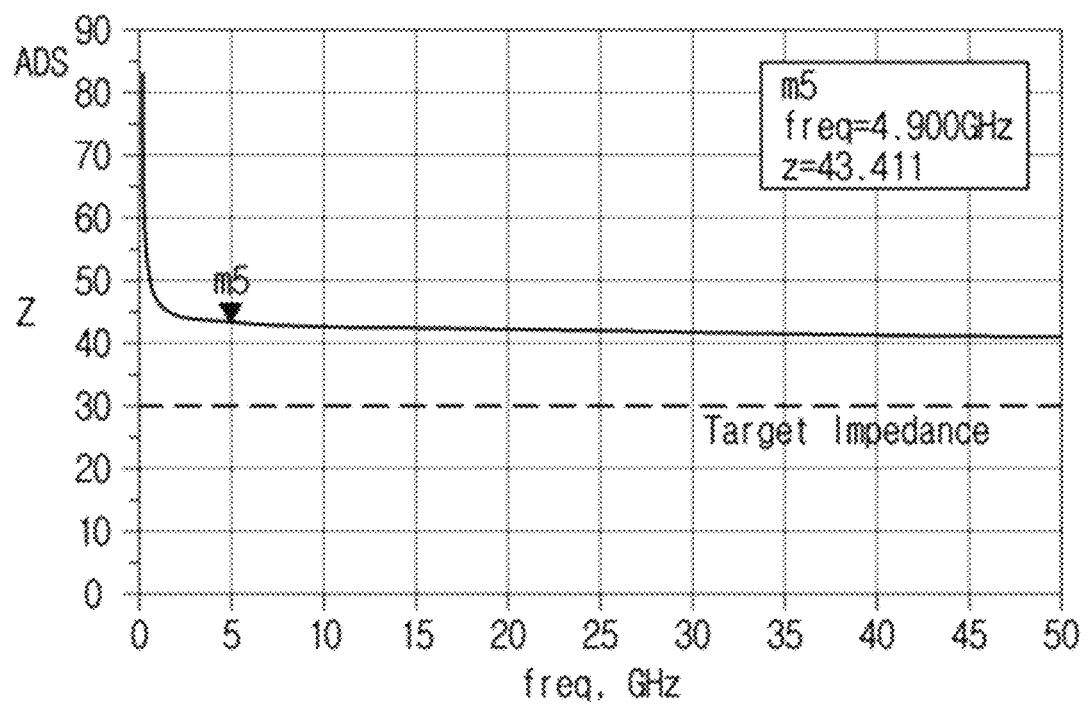
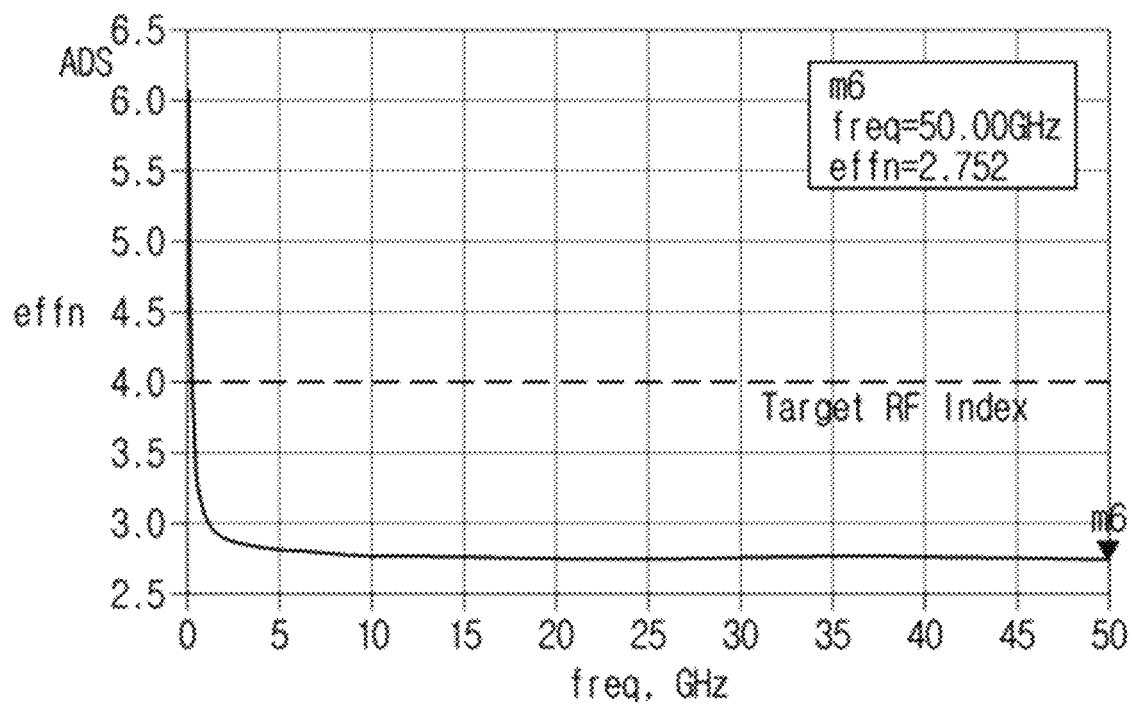

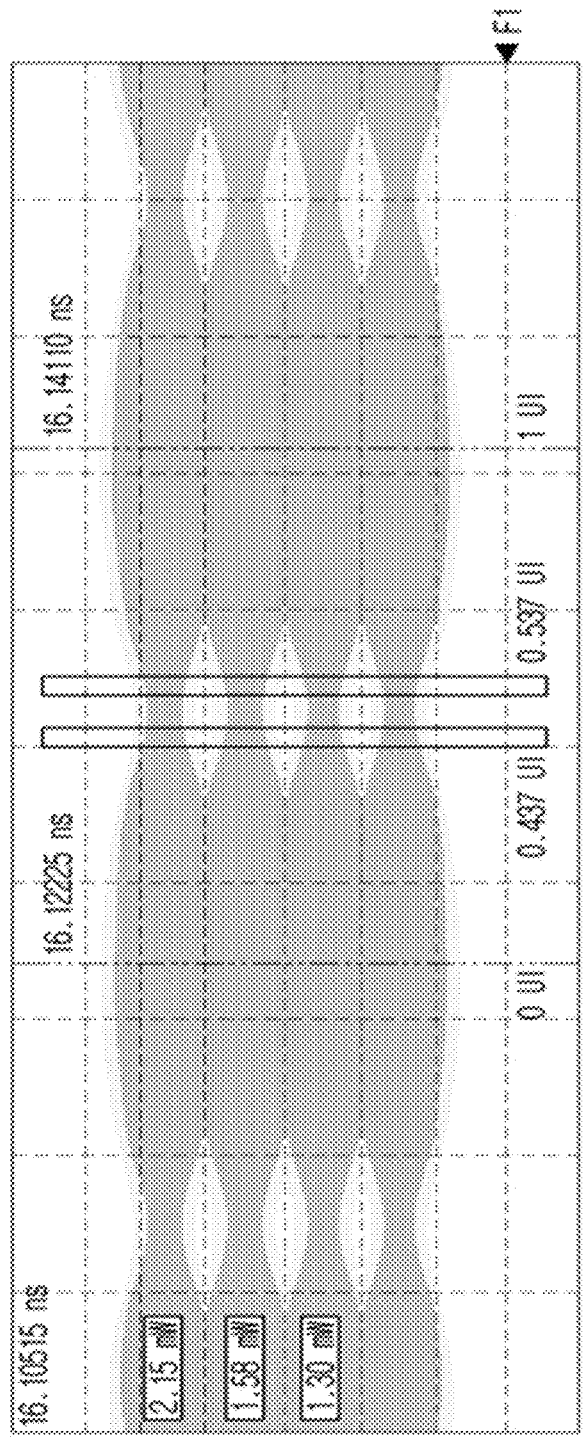

SILICON PHOTONICS-BASED OPTICAL MODULATION DEVICE WITH TWO METAL LAYERS

CROSS REFERENCE TO RELATED APPLICATION

The present application claims priority to Korean Patent Application No. 10-2022-0055279, filed May 4, 2022, the entire contents of which is incorporated herein for all purposes by this reference.

BACKGROUND OF THE INVENTION

1. Field of the Invention

The present disclosure relates to an optical modulation device and more particularly to a silicon photonics-based optical modulation device having two metal layers.

2. Description of the Related Art

Silicon Photonics is a technology that integrates photonics elements into a single chip using a commercial complementary metal-oxide-semiconductor (CMOS) semiconductor process.

Silicon photonics enables cost reduction of optical communication devices through mass production, miniaturization through two-dimensional or three-dimensional integration, and increase of capacity through repeated arrangement of devices. In particular, a silicon photonics-based optical modulator has recently been considered a key functional element for coping with exponentially increasing traffic in data centers and telecommunications.

SUMMARY OF THE INVENTION

It is an objective of the present disclosure to provide a silicon photonics-based optical modulation device having two metal layers.

It is another objective of the present disclosure to provide a silicon photonics-based Mach-Zehnder optical modulation device having two metal layers.

The objectives of the present disclosure are not limited to the above-mentioned ones, and other objectives which are not mentioned above will be clearly understood from the following description by those skilled in the art.

According to embodiments of the present disclosure, there is provided a silicon photonics-based optical modulation device having two metal layers.

A silicon photonics-based optical modulation device having two metal layers, according to one embodiment of the present disclosure, includes: a phase shifter including a first signal electrode, a second signal electrode, and at least two ground electrodes formed in a first metal layer, the phase shifter including two silicon optical waveguides; a ground unit formed in a second metal layer different from the first metal layer; and a pad unit formed in the second metal layer, provided with a first local area electrically connected to the ground unit, and electrically connected to the first signal electrode and the second signal electrode via a second local area thereof electrically isolated from the ground unit.

The pad unit may include: a ground pad formed in the first local area and electrically connected to the ground unit; a first signal pad formed in a first region of the second metal layer electrically isolated from the ground unit; a second signal pad formed in a second region of the second metal layer electrically isolated from the ground unit; a first signal transition portion electrically connected to the first signal pad and formed in the first metal layer so as to be connected to the first signal electrode; and a second signal transition portion electrically connected to the second signal pad and formed in the first metal layer so as to be connected to the second signal electrode.

Each of the first and second signal transition portions may have a width that varies in a direction of the first and second signal electrodes.

Each of the first and second signal electrodes may receive a first voltage that is input through a first electrode port, through a resistor connected to a terminal thereof, and provides a drive voltage of a driver electrically connected thereto through the pad unit.

One of the at least two ground electrodes may receive a second voltage input through a second electrode port and apply a silicon waveguide voltage by using the second voltage and the drive voltage.

In this case, the silicon optical waveguide may be a PN-junction silicon optical waveguide, and the silicon optical waveguide voltage may be adjusted independently by adjusting the second voltage.

In this case, the ground pad may be formed such that a region thereof overlapping the first signal transition portion and the second signal transition portion is adjusted to minimize RF index discontinuity and characteristic impedance of the pad unit and the phase shifter.

In addition, the silicon photonics-based optical modulation device having two metal layers, according to one embodiment of the present disclosure, may further include at least one metal bridge formed between the at least two ground electrodes.

In this case, the metal bridge may be formed in the second metal layer, and ends of the metal bridge may be electrically connected to the respective ends of the at least two ground electrodes formed in the first metal layer through via-contacts.

In this case, the phase shifter may be configured such that the capacitance thereof is independently adjusted by adjusting the width of the metal bridge.

In addition, the silicon photonics-based optical modulation device having two metal layers, according to one embodiment of the present disclosure, may further include a capacitor formed between the ground electrode and the ground unit.

The ground pad may be configured to surround at least one side surface of the first signal pad and the second signal pad.

A silicon photonics-based optical modulation device having two metal layers, according to another embodiment of the present disclosure, includes: a phase shifter including a first signal electrode, a second signal electrode, and at least two ground electrodes formed in a first metal layer; a pad unit formed in a second metal layer different from the first metal layer, provided with a first local area electrically connected to a ground, and electrically connected to the first signal electrode and the second signal electrode via a second local area thereof electrically isolated from the ground; and at least one metal bridge formed between the at least two ground electrodes.

The briefly summarized features are merely exemplary aspects of the present disclosure described below in detail and are not intended to limit the scope of the present disclosure.

According to the present disclosure, there is provided a silicon photonics-based optical modulation device having two metal layers.

The effects and advantages that can be achieved by the present disclosure are not limited to the ones mentioned above, and other effects and advantages which are not mentioned above but can be achieved by the present disclosure can be clearly understood by those skilled in the art from the following description.

BRIEF DESCRIPTION OF THE DRAWINGS

FIG. 13 is an explanatory diagram illustrating simulation results of a characteristic impedance and RF index of a phase shifter electrode; and FIG. 14 is an explanatory diagram illustrating a signal modulation verification result of a silicon photonics-based optical modulator having two metal layers, according to one embodiment of the present disclosure.

DESCRIPTION OF THE PREFERRED EMBODIMENTS

Figure 1:
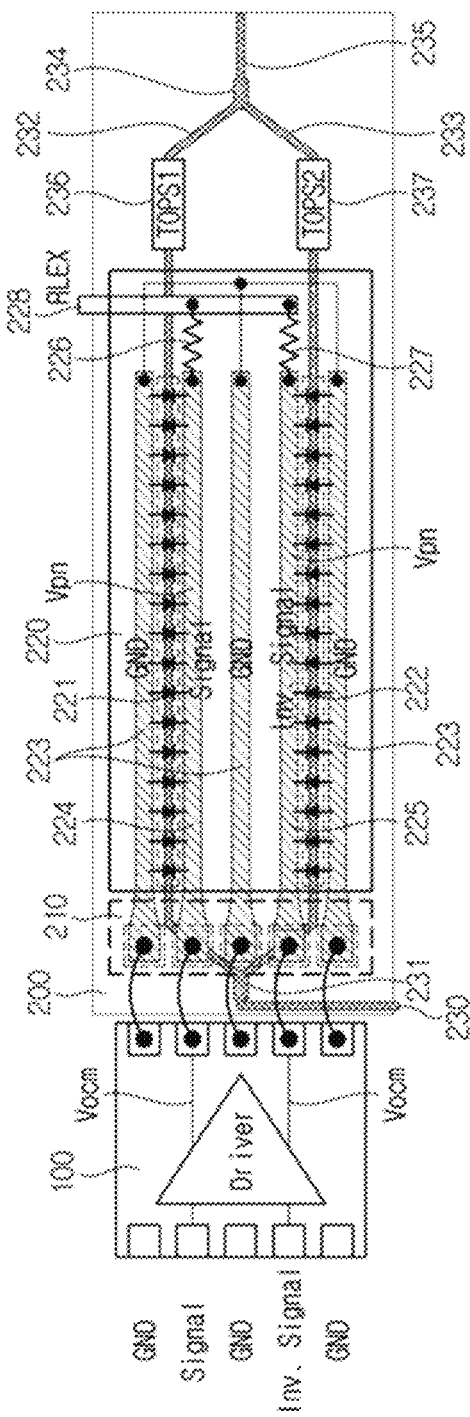
FIG. 1 is a diagram illustrating the construction of a conventional silicon photonics-based Mach-Zehnder optical modulator.

Herein below, exemplary embodiments of the present invention will be described in detail with reference to the accompanying drawings such that the invention can be easily practiced by those ordinarily skilled in the art to which this disclosure belongs. However, the present disclosure may be embodied in various forms and should not be construed as being limited to the exemplary embodiments disclosed herein.

In describing embodiments of the present disclosure, well-known functions or constructions will not be described in detail when it is determined that they may obscure the spirit of the present disclosure. Further, components not related to the present disclosure are not shown in the drawings and like reference numerals are given to like components.

It is to be understood in the following description that when one component is referred to as being "connected to", "combined with", or "coupled to" another component, it may include not only direct connection, but indirect connection with another component therebetween. It will be further understood that when a component "comprises" or "has" another component, it means that the component may further include another component, not excluding another component unless stated otherwise.

It will be understood that, although the terms "first," "second," etc. may be used herein to describe various components, these components should not be limited by these terms. These terms are only used to distinguish one component from another component. For instance, a first component discussed below could be termed a second component without departing from the teachings of the present invention. Similarly, the second component could also be termed the first component.

In the following description, components are discriminated from each other to clearly describe their characteristics, but it does not mean that they are necessarily physically separated. That is, a plurality of components may be integrated in one hardware or software module and one component may be divided into a plurality of hardware or software modules. Accordingly, integrated or divided embodiments are included in the scope of the present disclosure even if not specifically stated.

In the following description, components described in various embodiments are not all necessarily required and some components may be optional. Accordingly, embodiments composed of some of the components described in one embodiment are also included in the scope of the present disclosure. Further, embodiments implemented by adding components to various embodiments are also included in the scope of the present disclosure.

In the present disclosure, representations of positional relationships used herein, such as top, bottom, left, right, etc. are used for convenience of description, and when the figures are viewed in reverse, the positional relationships described herein may be interpreted in reverse.

Prior to describing embodiments of the present disclosure, a conventional silicon photonics-based optical modulator will be described below.

FIG. 1 is a diagram illustrating the construction of a silicon photonics-based Mach-Zehnder optical modulator according to one conventional art of the present disclosure.

As illustrated in FIG. 1, the light input through an input-side silicon optical waveguide 230 is split and input into two silicon optical waveguides 232 and 233 in an optical splitter 231, and the light beams are propagated to a phase shifter 220 of an optical modulator 200. The optical signals modulated by the phase shifter 220 are propagated respectively to thermo-optic-phase shifters (TOPS1 and TOPS2) 236 and 237, combined in an optical coupler 234, and output to an output-side silicon optical waveguide 235.

The PN-junction silicon optical waveguides 221 and 222 of the phase shifter 220 may be modeled with a plurality of PN diodes connected in parallel. In the PN-junction silicon optical waveguides 221 and 222 of the phase shifter 220, electrical signals are modulated into optical signals. The phase shifter 220 may have a ground-signal-ground-signal-ground (GSGSG) structure including RF ground electrodes 223, an RF signal electrode 224, and an RF inverted signal electrode 225 and may perform a push-pull operation. An end of the RF signal electrode 224 and an end of the RF inverted signal electrode 225 are provided with terminating resistors 226 and 227, respectively. An electronic element driver 100 for driving the optical modulator 200 has electrical I/O ports having a ground-signal-ground-signal-ground (GSGSG) structure. An input-side RF transition pad unit 210 of the optical modulator 200 and the output of the driver 100 are electrically connected to each other. The connection is made by wire bonding or is flip-chip bonding using solder bumps. Hereinafter, for convenience of description, wire bonding will be exemplified. However, it will be apparent to those skilled in the art that the same description can be applied to flip-chip bonding.

Figure 2:
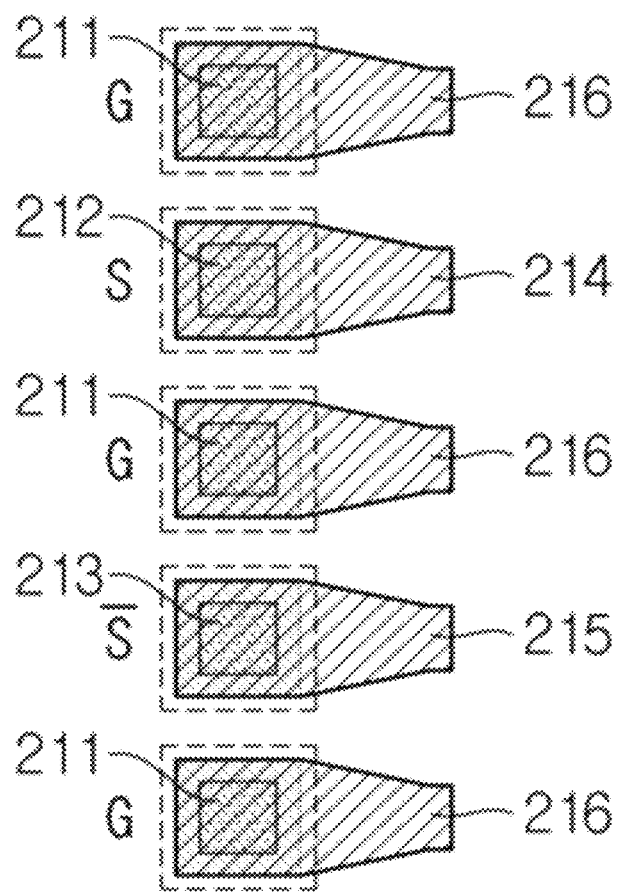
FIG. 2 is a diagram illustrating one example of an RF transition pad constituting the silicon photonics-based optical modulator.

FIG. 2 is a diagram illustrating one example of an RF transition pad unit constituting the silicon photonics-based optical modulator.

As illustrated in FIG. 2, the RF transition pad unit 210 is composed of an RF ground pad 211, an RF signal pad 212, and an RF inverted signal pad 213 and is connected to the driver 100 by wire bonding. For electrical connection of the phase shifter 220, each of the RF ground transition unit 216, the RF signal transition portion 214, and the RF inverted signal transition portion 215 is included.

In the case of a conventional high-speed driver 100, an optimized output common mode (Vocm) voltage must be applied to an RF signal output stage and an RF inverted signal output stage. When the high-speed driver 100 and the silicon photonics-based optical modulator 200 are connected in a manner illustrated in FIG. 1, a voltage $V_{RLEX}$ is applied to an RLEX-electrode port 228 to adjust the Vocm voltage. When the input voltage of the RLEX-electrode port 228 is denoted by $V_{RLEX}$, and the terminating resistance of a first terminating resistor 226 is denoted by RL1, a DC current flowing through a first terminating resistor 226, an RF signal electrode 224, and an RF signal pad 212 and an RF signal transition portion 214 of an RF transition pad unit 210 is denoted by Iout1, the relational expression "Vocm1=$V_{RLEX}$−(Iout1×RL1)" is established. Similarly, when the input voltage of the RLEX-electrode port 228 is denoted by $V_{RLEX}$, the resistance of a second terminating resistor 227 is denoted by RL2, and a DC current flowing through a second terminating resistor 227, an inverted signal electrode 225, and an RF inverted signal pad 213 and an RF inverted signal transition portion of the RF transition pad unit 210 is denoted by Iout2, the relational expression "Vocm2=$V_{RLEX}$−(Iout2×RL2)" can be established. Since RL1=RL2 in general, Iout1=Iout2. In addition, a bias voltage applied to the RF signal output stage and the RF inverted signal output stage of the driver is Vocm=Vocm1=Vocm2. In this structure, the voltage Vocm required to be applied to the output terminal of the driver 100 may be obtained by adjusting the voltage $V_{RLEX}$ applied to the RLEX-electrode port 228 of the silicon photonics-based optical modulator 200.

However, the conventional silicon photonics-based optical modulator 200 has a problem in that a voltage Vpn applied to the PN-junction silicon optical waveguides 221 and 222 is set to the voltage Vocm required for the driver (i.e., Vpn=Vocm). When the voltage Vpn required for the PN junction optical waveguides of the silicon optical modulator 200 differs from the voltage Vocm required for the driver, the characteristic impedance Z0, the modulation bandwidth, and the modulation efficiency of the phase shifter 220 of the optical modulator 200 are changed.

Figure 3:
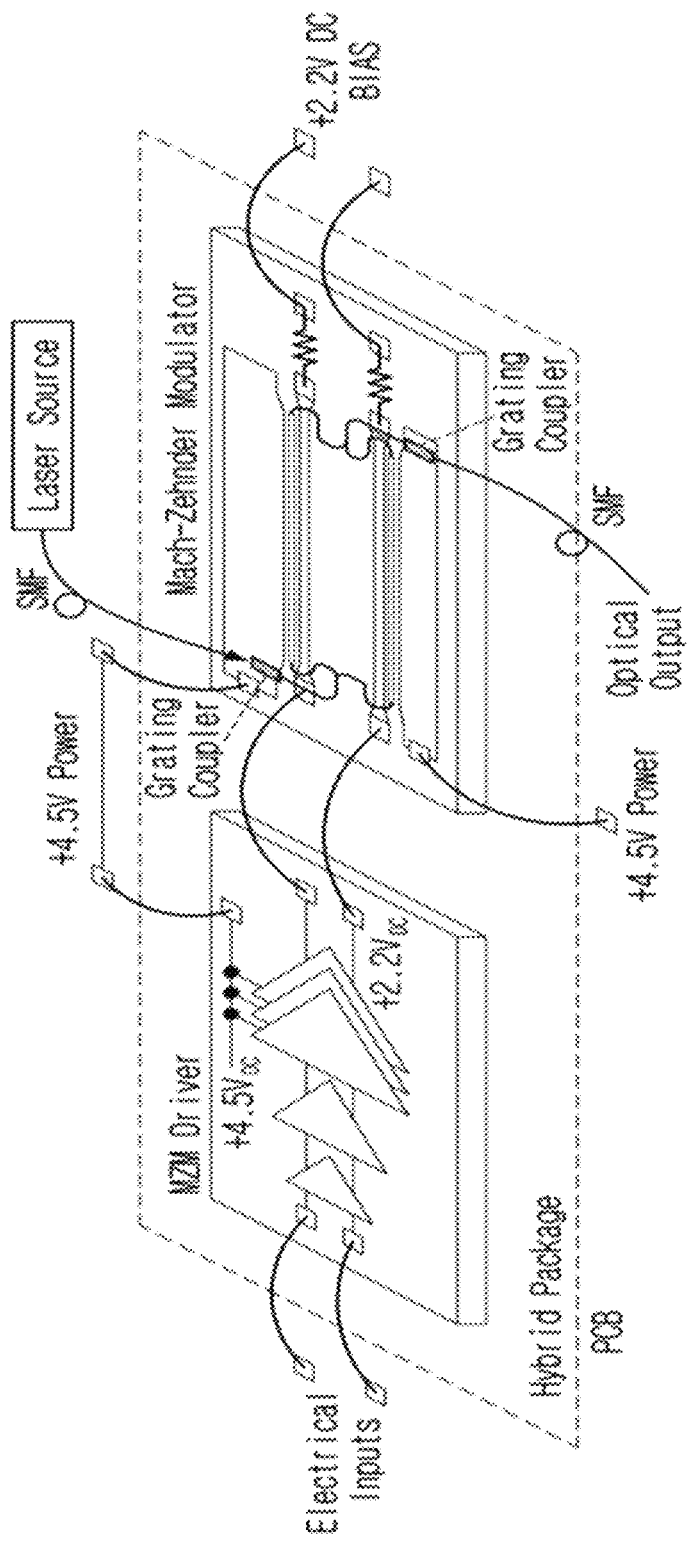
FIG. 3 is a diagram illustrating the construction of another conventional silicon photonics-based Mach-Zehnder optical modulator.

FIG. 3 is a diagram illustrating the construction of another conventional silicon photonics-based Mach-Zehnder optical modulator.

As illustrated in FIG. 3, a driver for driving a silicon photonics-based optical modulator has an advantage of not requiring a voltage supply through an external silicon photonics-based optical modulator because a Vocm voltage (+2.2 VDc) is applied directly to the output terminal from a driver supply power source (+4.5 V). In addition, when a voltage equal to the Vocm voltage is applied to the terminating resistor (+2.2V DC BIAS) of the optical modulator, the DC current flowing through the optical modulator can be adjusted to zero. Therefore, the DC power consumption can be greatly reduced. In addition, the voltage (+4.5 V−2.2 V=2.3 V) applied to the PN-junction silicon optical waveguides can be independently adjusted. However, in the case of the structure of FIG. 3, the RF ground of the driver and the RF ground of the silicon photonics-based optical modulator cannot be connected to each other via an RF ground line (ground wire bonding). If connected, a voltage of +4.5 V is applied to the ground of the driver. In addition, the higher the speed of the RF electrical signal, the more deteriorated the signal quality when there is not RF ground connection.

Figure 4A:
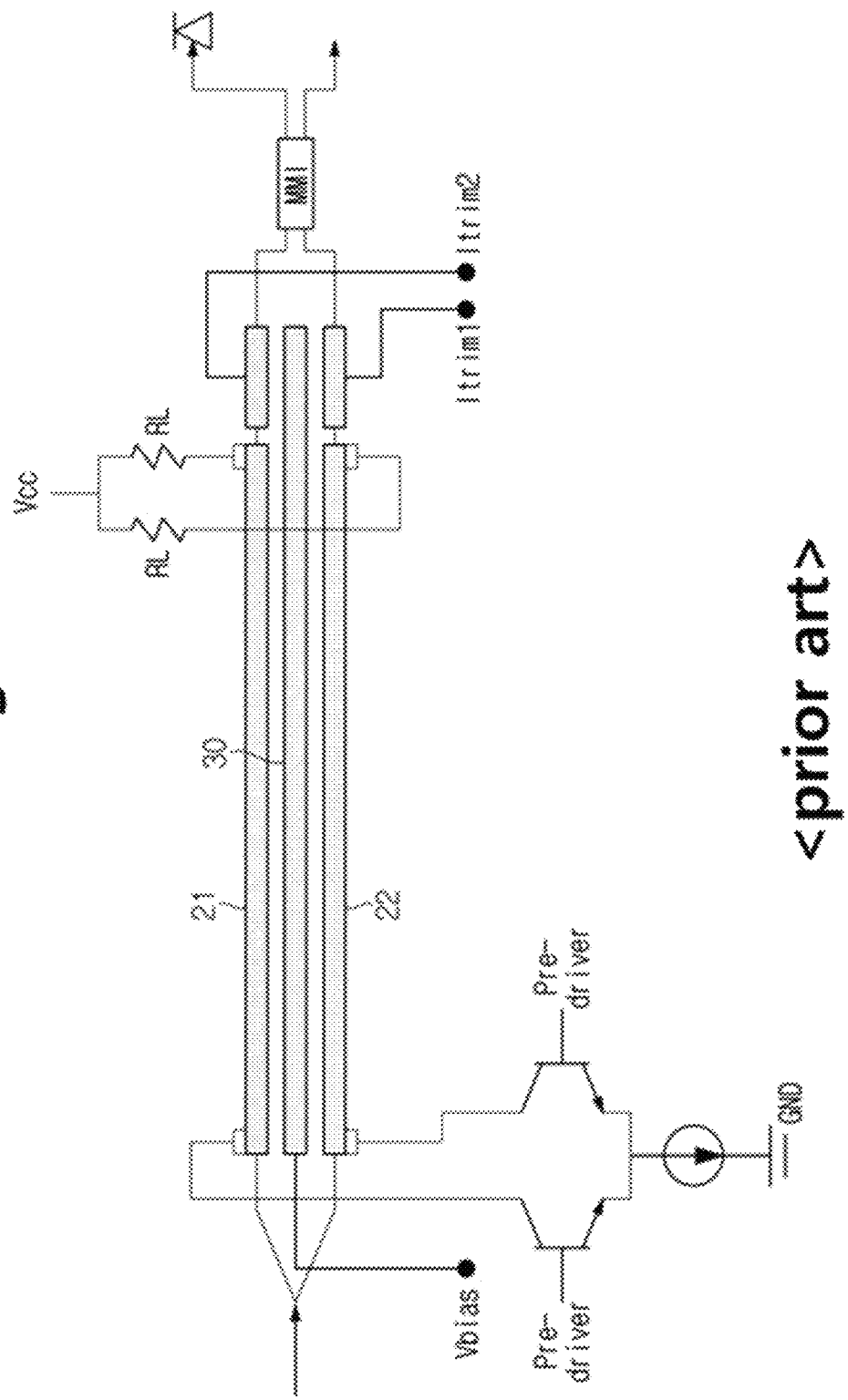
FIGS. 4A and 4B are diagrams illustrating the construction of a further conventional silicon photonics-based optical modulator.
Figure 4B:
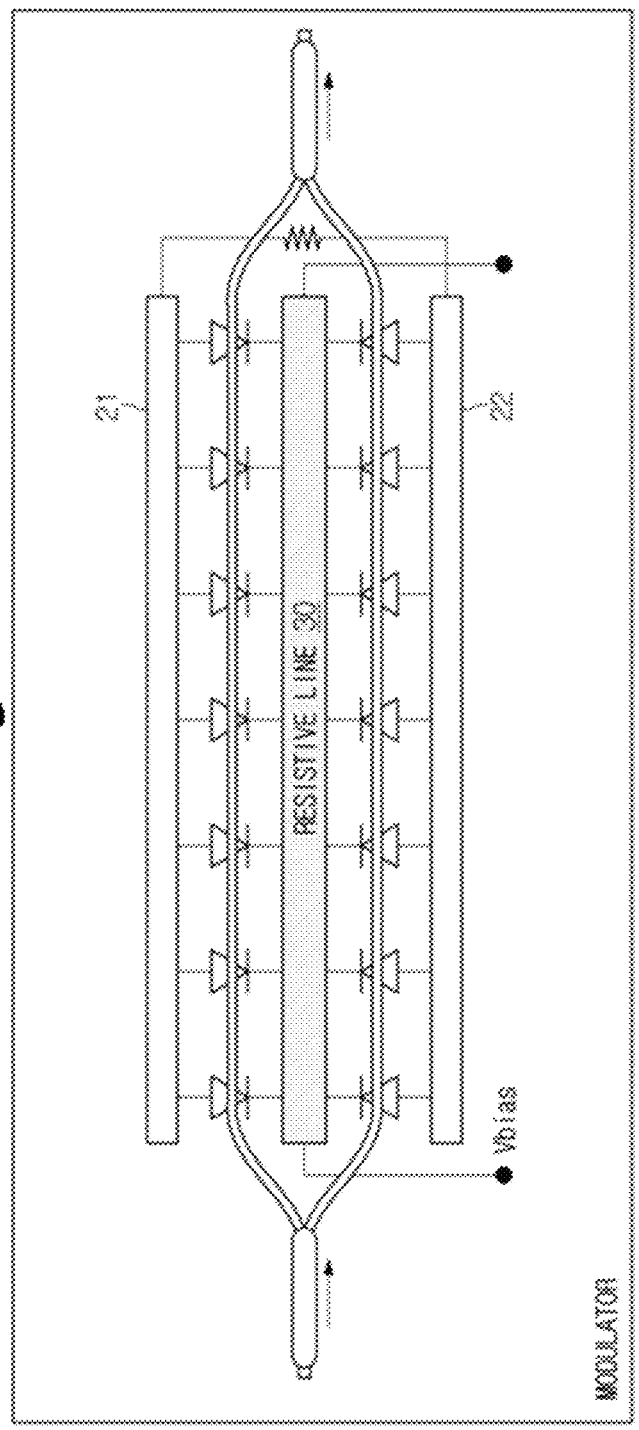

FIG. 4 is a diagram illustrating the construction of a further conventional silicon photonics-based optical modulator.

As illustrated in FIG. 4, the silicon photonics-based optical modulator can supply the bias voltage Vbias required for the phase shift through a separate independent electrode 30. A PN-junction silicon optical waveguide is connected between a first RF electrode 21 and a bias electrode 30, and another PN-junction silicon optical waveguide is connected between a second RF electrode 22 and the bias electrode 30, so that the PN-junction silicon light waveguides are connected in series. This structure is advantageous in that it is possible to apply a voltage required for the PN-junction silicon optical waveguides through the independent electrode 30. However, the structure is disadvantageous in that the RF electrical signal connection between the driver chip and the silicon photonics-based optical modulator chip can be made only via the RF signal electrode and the RF inverted signal electrode without requiring an RF ground line.

Embodiments of the present disclosure are intended to solve the problems of conventional silicon photonics-based optical modulators. The present disclosure provides an optical modulation device capable of: connecting all RS signal transmission lines including ground lines to a driver; applying a driver DC bias voltage Vcom required for an output stage of the driver; providing an overall excellent RF frequency response characteristic by independently applying an optical modulator DC bias voltage Vpn required for the silicon photonics-based Mach-Zehnder optical modulator; and being driven under voltage conditions in which characteristic impedance, RF index, modulation bandwidth, and modulation efficiency are optimized.

Embodiments of the present disclosure may include a silicon photonics-based Mach-Zehnder optical modulation device having two metal layers.

Figure 5:
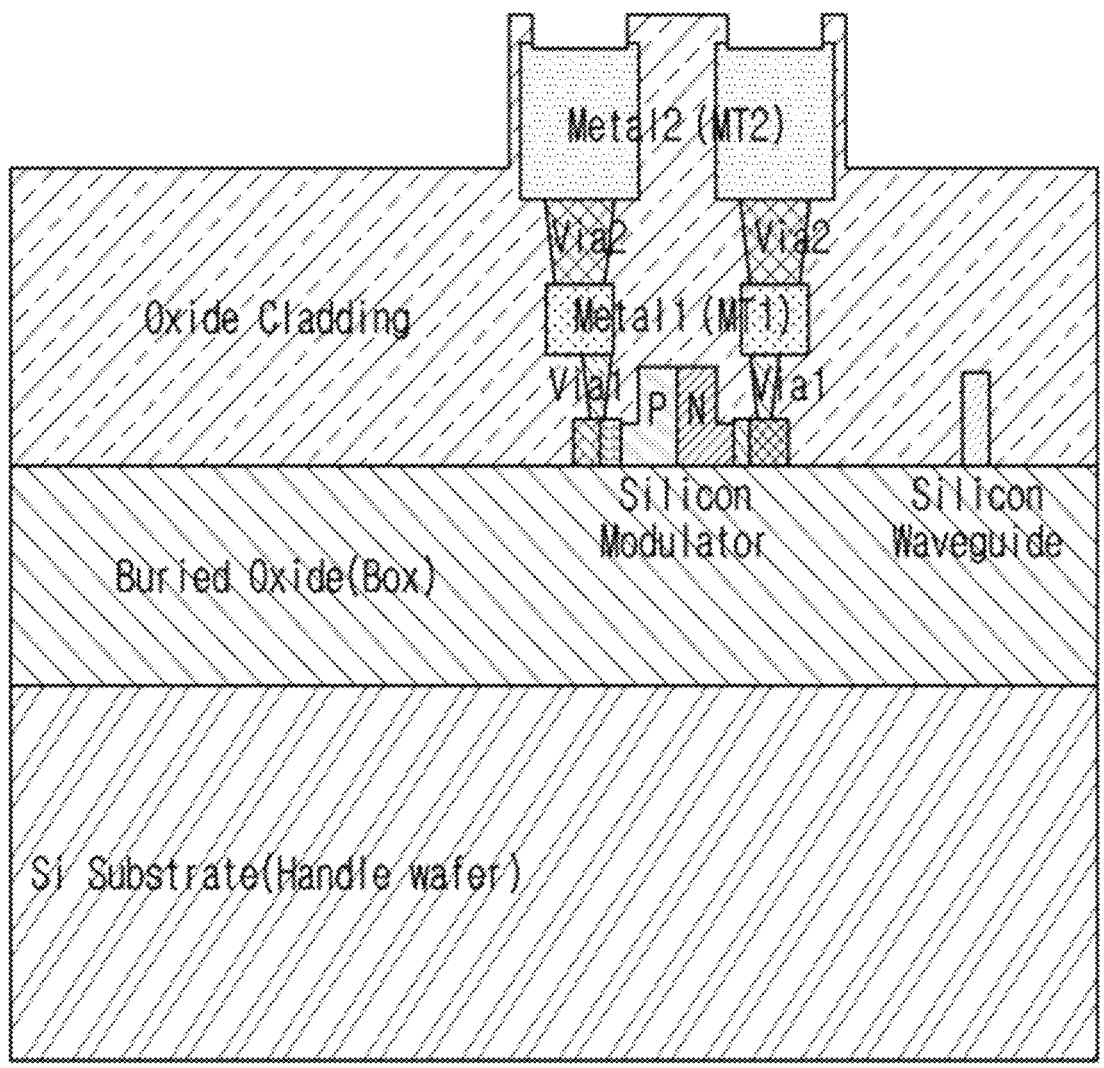
FIG. 5 is a diagram illustrating a cross-sectional structure of an optical modulator chip implemented in a silicon photonics process platform providing with two metal layers.

FIG. 5 is a diagram illustrating a cross-sectional structure of an optical modulator chip implemented in a silicon photonics process platform providing two metal layers.

As illustrated in FIG. 5, the optical modulator chip may include a buried oxide (BOX) layer formed on a silicon substrate, an oxide cladding layer provided on the BOX layer, and a top silicon layer provided between the BOX layer and the oxide cladding layer. The top silicon layer is used to form silicon optical waveguides. In general, there are channel-shaped silicon optical waveguides having no slab and rib-shaped silicon optical waveguides having a slab. PN doping may be performed on the rib-shaped silicon optical waveguides to form PN-junction silicon optical waveguides constituting a phase shifter of an optical modulator. The PN-junction silicon optical waveguides may be electrically connected to each other via a lower metal layer MT1 and a first via-contact Via1 and via an upper metal layer MT2 and a second via-contact Via2. The first via-contact Via1 and the PN-junction silicon optical waveguide are electrically connected in an ohmic contact manner.

Figure 6:
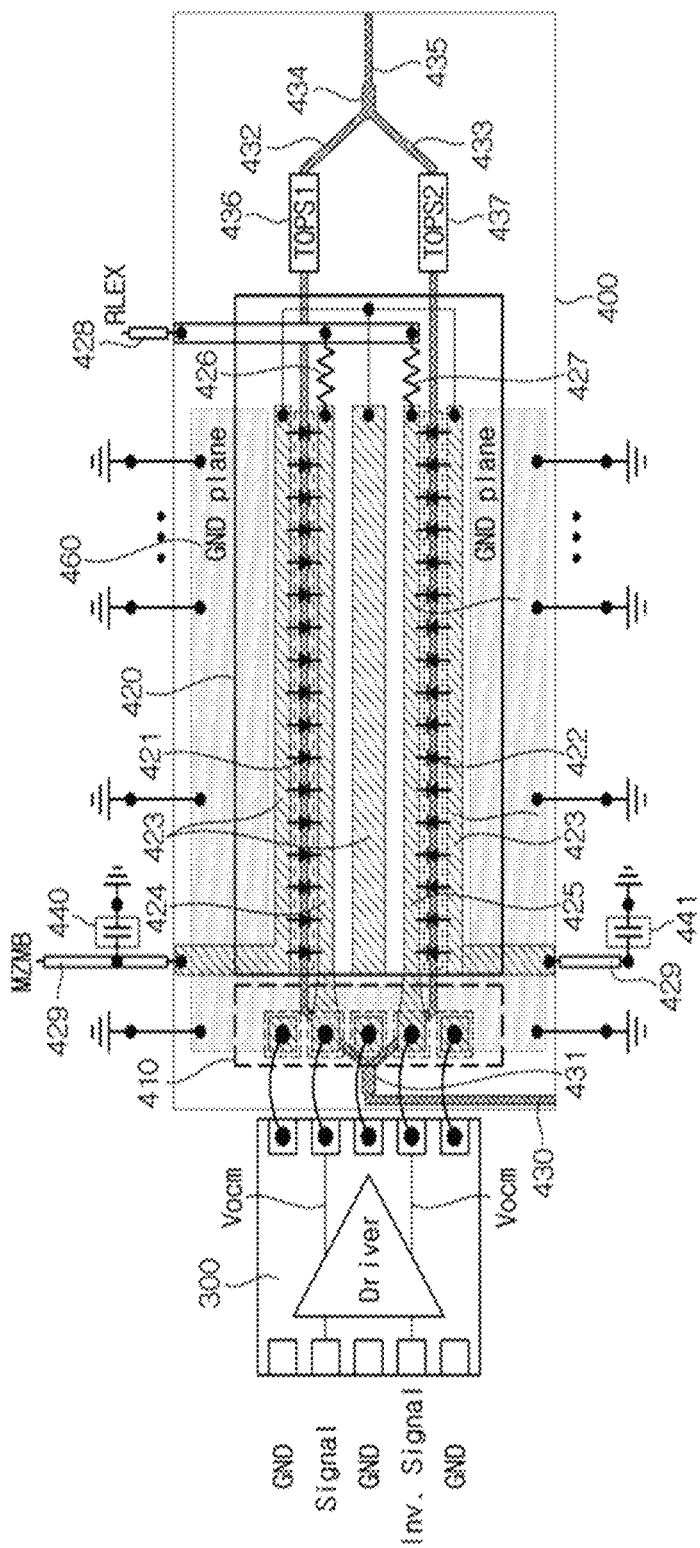
FIG. 6 is a diagram illustrating the construction of a silicon photonics-based optical modulation device having two metal layers, according to one embodiment of the present disclosure.

FIG. 6 is a diagram illustrating the construction of a silicon photonics-based optical modulation device having two metal layers, according to one embodiment of the present disclosure. FIG. 6 is a diagram illustrating an example of a Mach-Zehnder optical modulation device. In this embodiment of the present disclosure, the optical modulation device and the optical modulator may be used in the same sense.

Referring to in FIG. 6, light input through an input-side silicon optical waveguide 430 is split and input into two silicon optical waveguides 432 and 433 in an optical splitter 431, and the split light beams are propagated to a phase shifter 420 of an optical modulator 400. The optical signals modulated by the phase shifter 420 are propagated respectively to thermo-optic-phase shifters 436 and 437, combined in an optical coupler 434, and output to an output-side silicon optical waveguide 435. The PN-junction silicon optical waveguides 421 and 422 of the phase shifter 420 of the optical modulator 400 may be modeled with a plurality of PN diodes connected in parallel.

In the PN-junction silicon optical waveguides 421 and 422 of the phase shifter 420, electrical signals are modulated into optical signals. The phase shifter 420 may have a ground-signal-ground-signal-ground (GSGSG) structure including RF ground electrodes 423, an RF signal electrode 424, and an RF inverted signal electrode 425 and may perform a push-pull operation. An end of the RF signal electrode 424 and an end of the RF inverted signal electrode 425 are provided with terminating resistors 426 and 427, respectively. A driver 300 has electrical I/O ports having a GSGSG structure, and the RF transition pad unit 410 at the input stage of the optical modulator 400 and the output pad of the driver 300 are electrically connected. The connection may be made by conventional wire bonding or may be made by flip chip bonding using solder bumps.

The silicon photonics-based optical modulation device 400 having two metal layers, according to one embodiment of the present disclosure, includes an RF transition pad unit 410 having two metal layers.

Figure 7A:
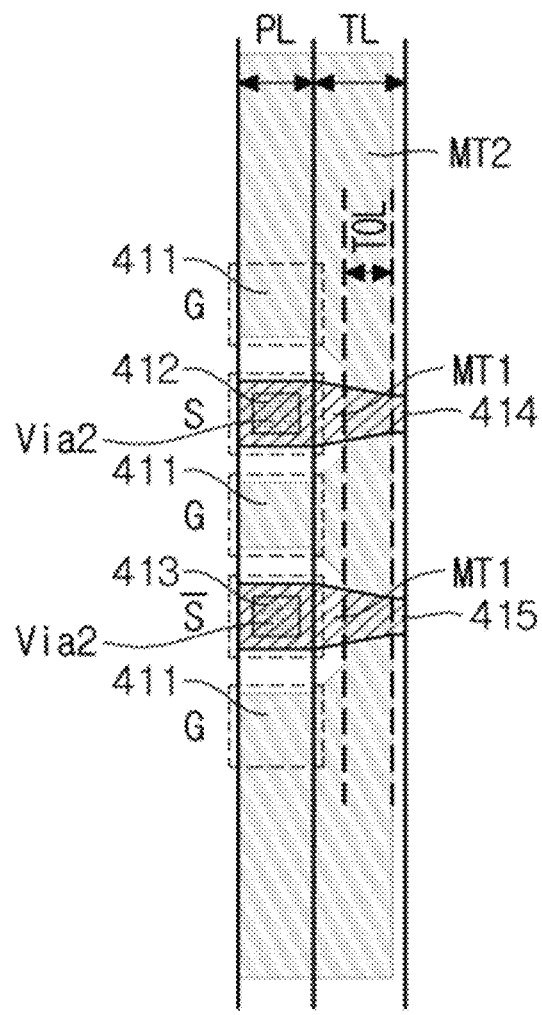
FIGS. 7A and 7B are diagrams illustrating the construction of an RF transition pad unit according to one embodiment of the present disclosure.
Figure 7B:
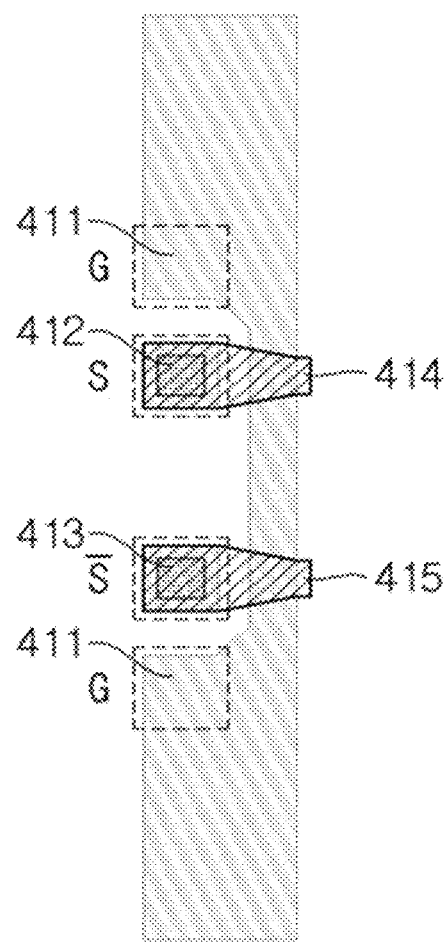

FIGS. 7A and 7B are diagrams illustrating the construction of an RF transition pad unit according to one embodiment of the present disclosure. FIG. 7A is a diagram illustrating the structure of a GSGSG RF transition pad unit among various types of transition pad units and FIG. 7B is a diagram illustrating the structure of a GS-SG transition pad unit among various types of transition pad units. Hereinafter, the GSGSG transition pad unit of FIG. 7A will be described. Although only the structure of FIG. 7A is described, it is apparent to those skilled in the art that the structure of FIG. 7B can be described similarly.

As illustrated in FIG. 7A, the RF transition pad unit 410 includes an RF ground pad 411 assigned to an MT2 layer, and an RF signal pad 412 and an RF inverted signal pad 413 assigned to an MT1 layer, the MT2 layer, and the Via2 layer. For example, the RF signal transition portion 414 and the RF inverted signal transition portion 415 which are tapered to have varying width are assigned to the MT1 layer. Each of the RF signal pad 412 and the RF inverted signal pad 413 includes the second via-contact Via2 for connection between the RF signal transition portions 414 and the RF inverted signal transition portion 415 and the MT1 and MT2 layers. The cross-section of the MT1/MT2/Via2 connection structure has a shape illustrated in FIG. 5. In the embodiment of the present disclosure, the RF signal transition portion 414 and the RF inverted signal transition portion 415 are described as MT1, which is a lower metal layer, but may be described as MT2 according to embodiments.

The RF signal pad unit 412 and the RF inverted signal pad unit 413 may be wire-bonded to the separated driver chip 300. The length of the RF signal pad 412 and the length of the RF inverted signal pad 413 may be denoted by PL which stands for pad length, and the length of the RF signal transition portion 414 and the length of the RF inverted signal transition portion 415 may be denoted by TL which stands for transition length.

Figure 8:
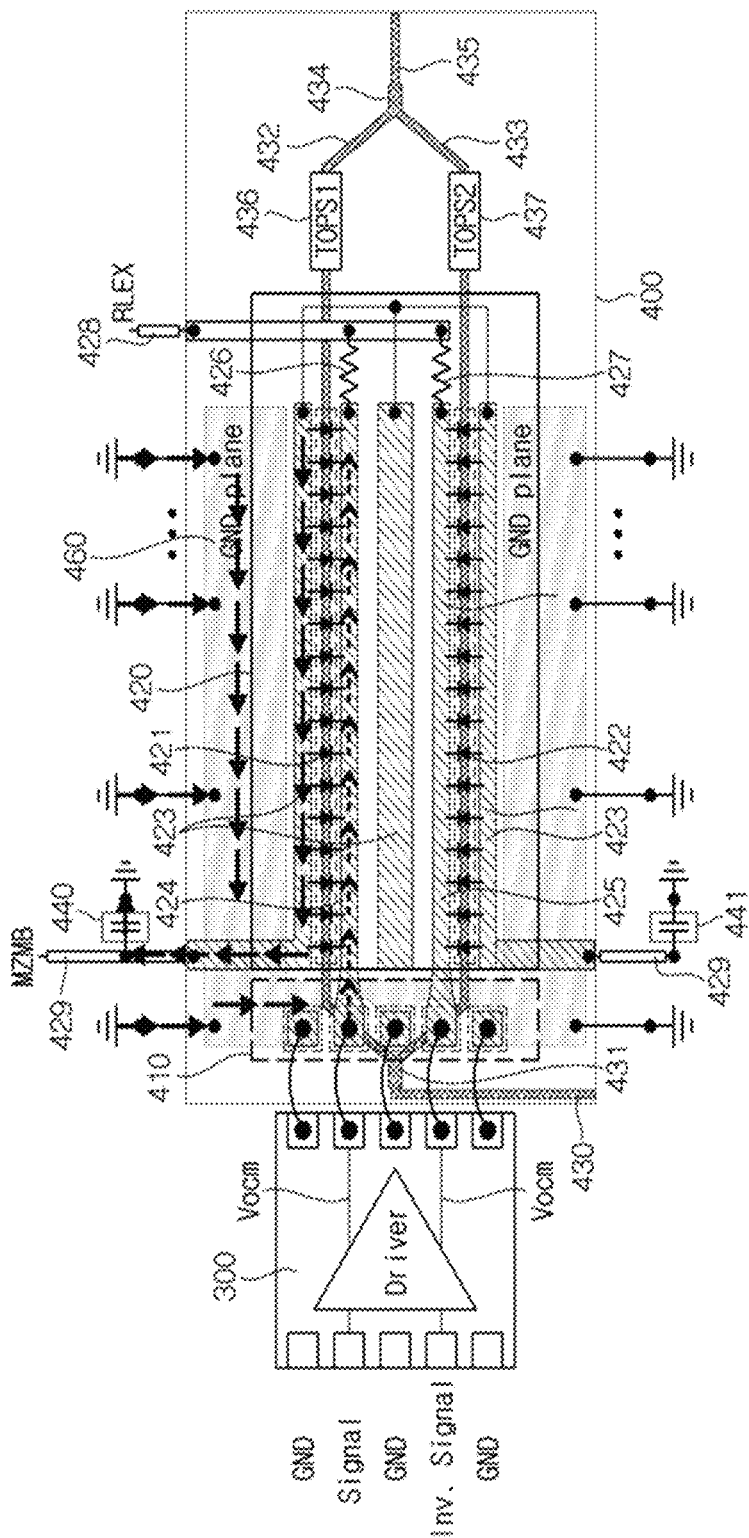
FIG. 8 is a diagram illustrating the flow of signal current and return current in a silicon photonics-based optical modulation device having two metal layers, according to one embodiment of the present disclosure.

In the optical modulation device according to one embodiment of the present disclosure, a signal, an inverted signal, and the ground are separated into two separate metal layers by using the RF transition pad 410. Therefore, the RF ground electrode 423 as well as the RF signal electrode 424 and the RF inverted signal electrode 425 of the phase shifter 420 can be connected by wire bonding. Therefore, the optical modulation device can transmit an RF electrical signal without distortion. The RF ground pad 411 is connected, via a metal layer, to a ground plane 460 distributed in the chip of the optical modulator 400. The ground plane 460 is connected to the RF ground electrode 423 of the phase shifter 420 through decoupling capacitors 440 and 441. The ground plane 460 and the RF ground electrode 423 may be directly connected to each other via an ultra-compact decoupling capacitor or the like packaged on the chip of the optical modulator 400, or may be connected via a decoupling capacitor provided on a printed circuit board (PCB) outside the chip. In the embodiment of the present disclosure, an RF return current may flow to the phase shifter 420 through the separated decoupling capacitors 440 and 441. Here, as illustrated in FIG. 8, the RF return current is a current flowing to the ground electrode 423 and the ground plane 460, the current corresponding to an RF signal current and an RF inverted signal current supplied to the RF signal pad 412, the RF inverted signal pad 413, the RF signal transition portion 414, and the RF inverted signal transition portion 415 of the RF transition pad unit 410. For convenience of description, the current flowing through the RF inverted signal pad 413 is not illustrated in FIG. 8.

An MZMB-electrode port 429 is connected to a node between the RF ground electrode 423 and the decoupling capacitor 440 to apply independent bias voltages $V_{MZMB}$ to the PN-junction silicon optical waveguides 421 and 422.

The driver 300 can operate to exhibit optimum performance when the output common mode (Vocm) voltage to the RF signal output stage and the RF inverted signal output stage. A $V_{RLEX}$ voltage is applied to the RLEX-electrode port 428 at an edge of each of the terminating resistors 426, 427 included in the phase shifter 420 of the optical modulator 400 to apply the Vocm voltage. When the resistance of the first terminating resistor 426 is denoted by RL1, and a DC current flowing through the first terminating resistor 426, the RF signal electrode 424, and the RF signal pad 412 and the RF signal transition portion 414 of the RF transition pad unit 410 is denoted by Iout1, the relational expression "Vocm1=$V_{RLEX}$−(Iout1×RL1)" is established. Similarly, when the resistance of the second terminating resistor 427 is denoted by RL2, and a DC current flowing through the second terminating resistor 427, the inverted signal electrode 425, and the RF inverted signal pad 413 and the RF inverted signal transition portion of the RF transition pad unit 410 is denoted by Iout2, the relational expression "Vocm2=$V_{RLEX}$−(Iout2×RL2)" can be established. Since RL1=RL2 in general, Iout1=Iout2. In addition, a bias voltage applied to the RF signal output stage and the RF inverted signal output stage of the driver 300 is Vocm=Vocm1=Vocm2. As described above, the voltage Vocm required to be applied to the output stage of the driver 300 may be obtained by adjusting the voltage $V_{RLEX}$ applied to the RLEX-electrode port 428 of the optical modulator 400.

Figure 9:
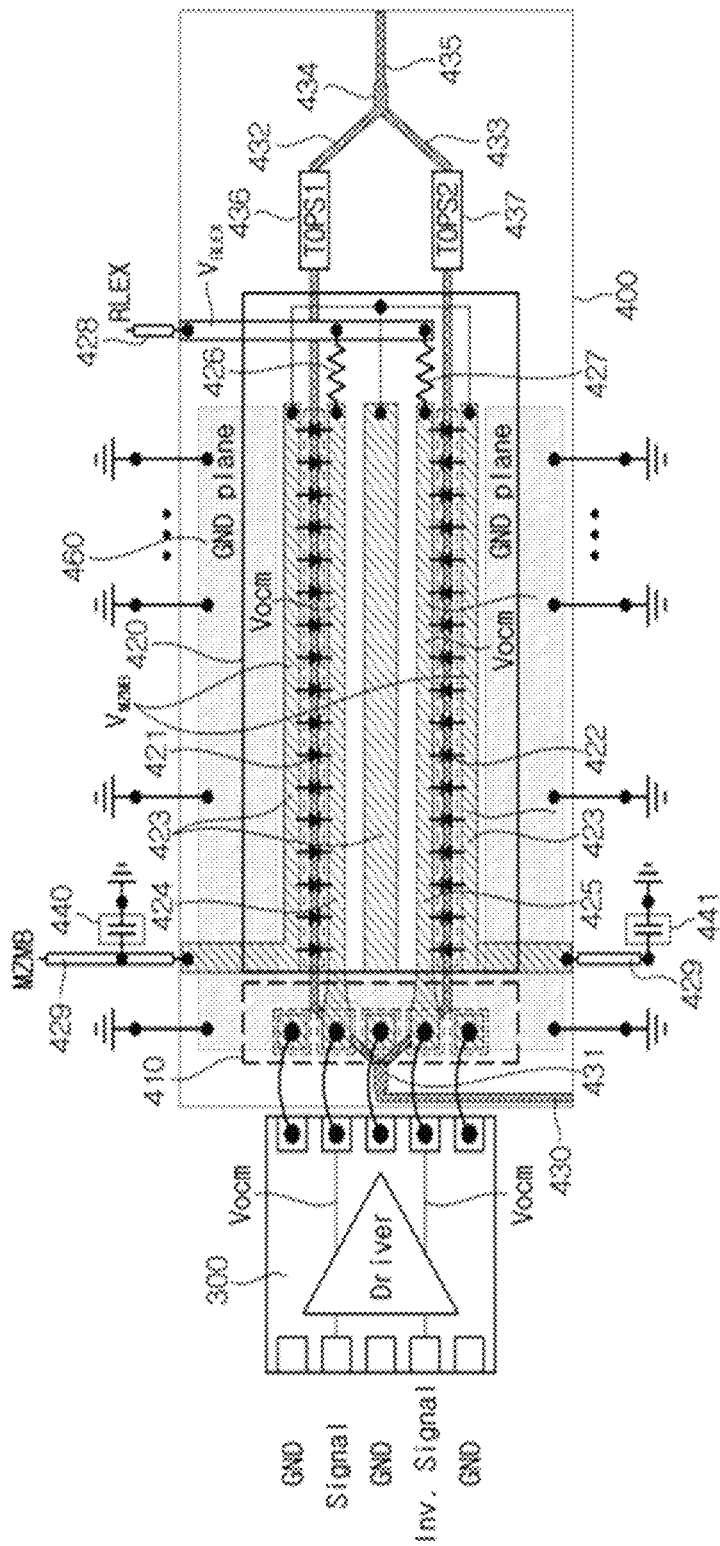
FIG. 9 is a diagram illustrating a voltage applied to each of a driver 300 and an optical modulator 400.

FIG. 9 is a diagram illustrating voltages applied to the respective parts of the driver 300 and the optical modulator 400. The voltage Vpn=Vocm−$V_{MZMB}$ may be applied to the PN-junction silicon optical waveguides 421 and 422 of the optical modulator 400. That is, the voltage Vpn applied to the PN-junction silicon optical waveguides 421 and 422 can be adjusted by adjusting the voltage $V_{MZMB}$. Accordingly, the silicon photonics-based optical modulator 400 having two metal layers, according to the present disclosure, can supply the required voltage Vocm to the driver 300 while independently controlling the voltage Vpn applied to the PN-junction silicon optical waveguides 421 and 422. Therefore, regardless of the voltage Vocm required for the driver 300, the characteristic impedance Z0, the modulation bandwidth, and the modulation efficiency of the phase shifter 420 of the optical modulator 400 can be controlled by using the optimum voltage Vpn.

The structure of the silicon photonics-based optical modulator 400 having two metal layers, according to one embodiment of the present disclosure, may have additional advantages described below. The characteristic impedance and RF index discontinuity can be minimized by adjusting the area where the RF signal transition portion 414 and the RF inverted signal transition portion 415 of the RF transition pad unit 410 overlap the MT2 layer to which the RF ground pad 411 is connected. The MT1 layer of the RF signal transition portion 414 and the RF inverted signal transition portion 415 and the MT2 layer connected to the RF ground pad 411 have a spacing of 1 μm therebetween. In the embodiment of the present disclosure, the spacing affects the addition of a capacitor to the transmission line. A conventional RF transition pad unit has a larger characteristic impedance and a smaller RF index than a typical optical modulator, so that there is a problem in that impedance mismatching occurs. Due to the problem, it is difficult to achieve the characteristic impedance matching and the propagation speed matching of RF microwave waves ($n_{RF}$=$n_{Optical}$=~4.0) and propagated light waves. However, in the RF transition pad unit 410 of the optical modulator according to one embodiment of the present disclosure, since there is an area where the MT1 layer and the MT2 layer overlap each other, the capacitance is increased. Therefore, the characteristic impedance and the RF index of the RF transition pad unit 410 are designed to be similar to those of the optical modulator 400.

The characteristic impedance of a transmission line, such as an RF transition pad can be represented by Z0=$\sqrt{L/C}$, and the RF index can be represented by $n_{RF}$=$c\sqrt{LC}$. Here, L denotes the inductance of the transmission line, C denotes the capacitance, and c denotes the propagation speed of electromagnetic waves in a vacuum condition. Due to the characteristic impedance mismatching and the RF index mismatching between the RF transition pad unit and the optical modulator, the characteristics of the optical modulator may be deteriorated. Since the RF transition pad unit 410 of the optical modulator according to one embodiment of the present disclosure has an increased capacitance value, the optical modulator has an advantage that the characteristic impedance matching and the RF index matching are easy to achieve. For example, with the method of adjusting the area where the MT1 layer and the MT2 layer overlap each other to control the transition overlap length (TOL) illustrated in FIG. 7, it is possible to control the impedance and the propagation speed of the RF electrical signal.

Figure 10:
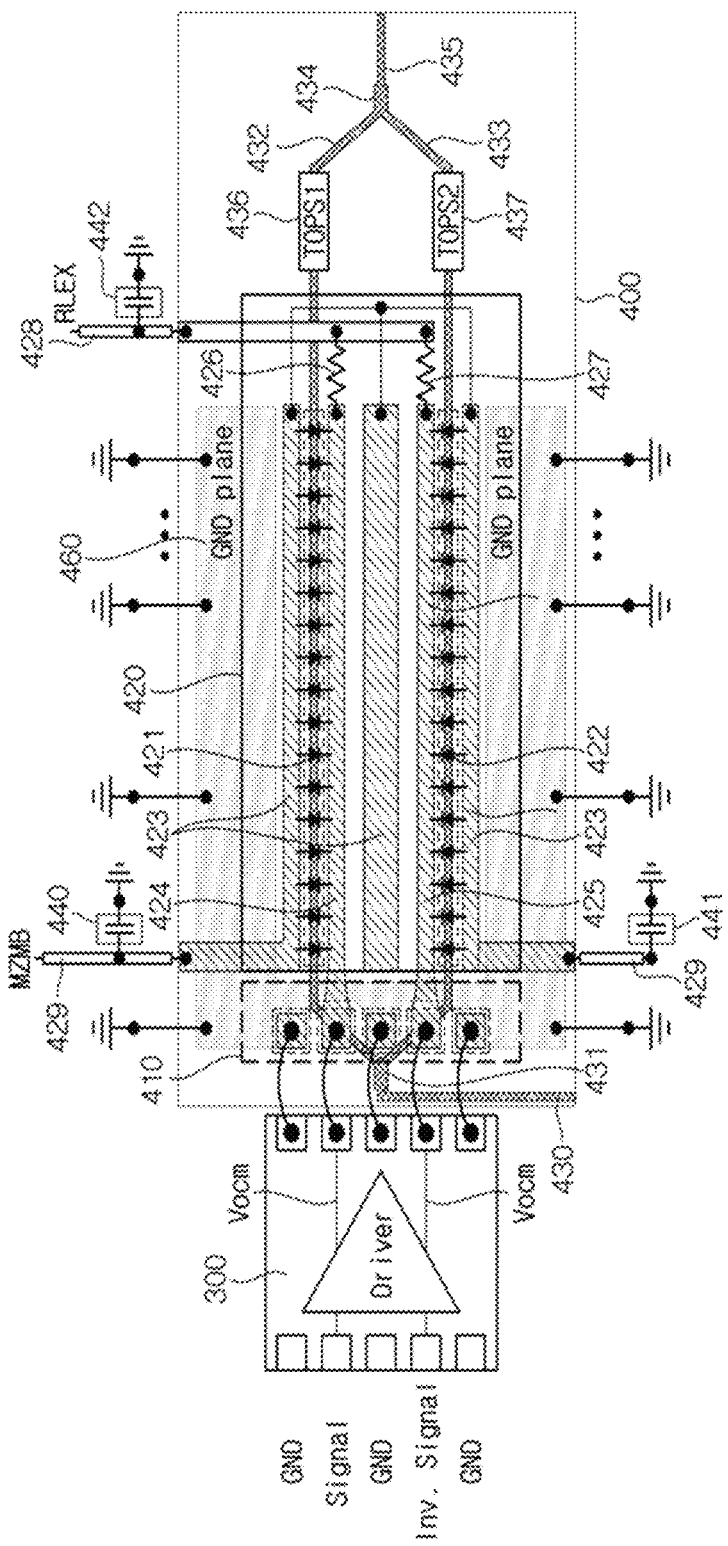
FIG. 10 is a diagram illustrating the construction of a silicon photonics-based optical modulator having two metal layers, according to another embodiment of the present disclosure.

In the optical modulator structure 400 according to one embodiment of the present disclosure described above, the phase shifter 420 is formed in the MT1 (lower metal layer) and the ground plane 260 is formed in the MT2 (upper metal layer). However, the present disclosure is not limited thereto. The MT1 and MT2 may be switched. Therefore, the layers of the RF transition pad 410 having two metal layers may be switched. Further, a silicon photonics-based optical modulator 400 having two metal layers according to another embodiment of the present disclosure may be configured such that a decoupling capacitor 442 is added to the RLEX-electrode port 428 as illustrated in FIG. 10 to prevent the degradation of RF performance.

Figure 11:
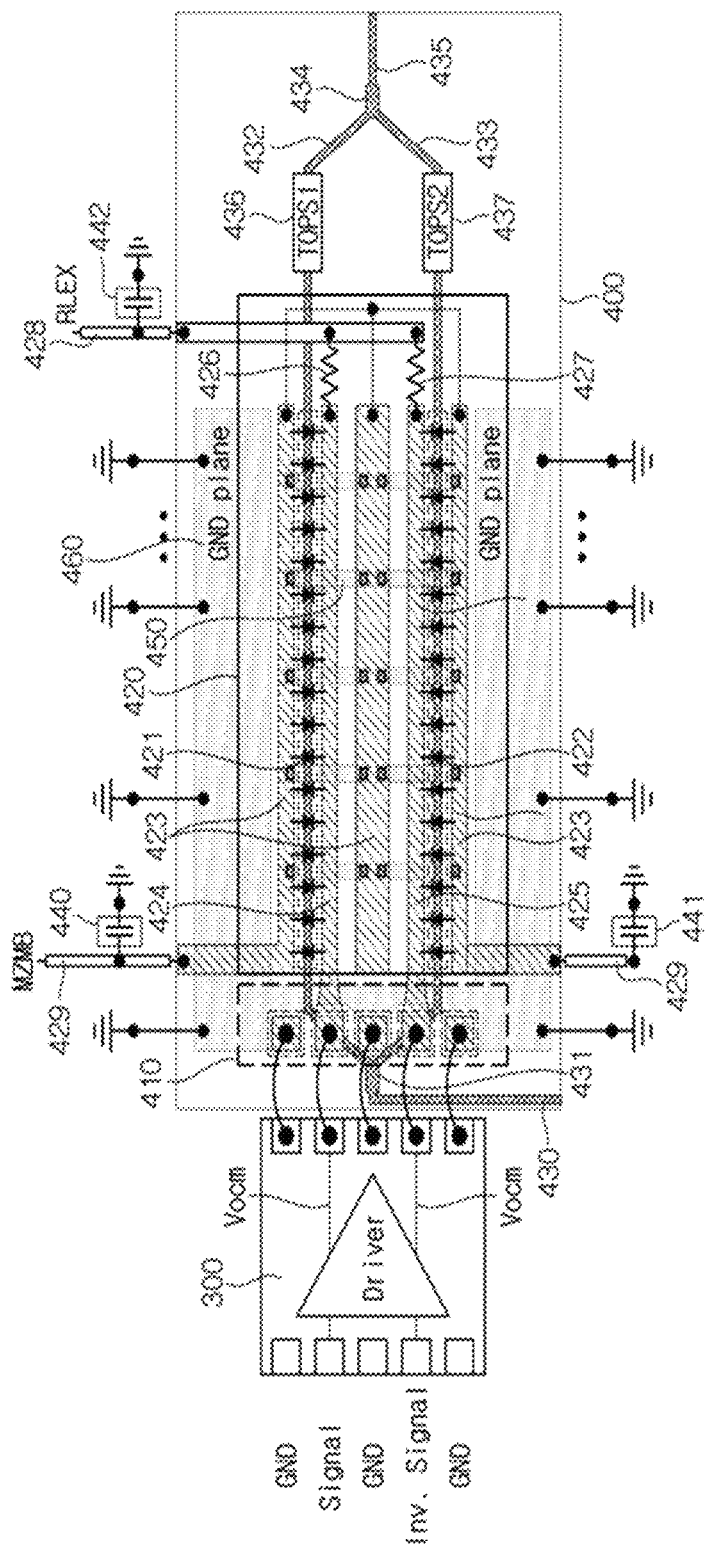
FIG. 11 is a diagram illustrating the construction of a silicon photonics-based optical modulator having two metal layers, according to a further embodiment of the present disclosure.
Figure 12:
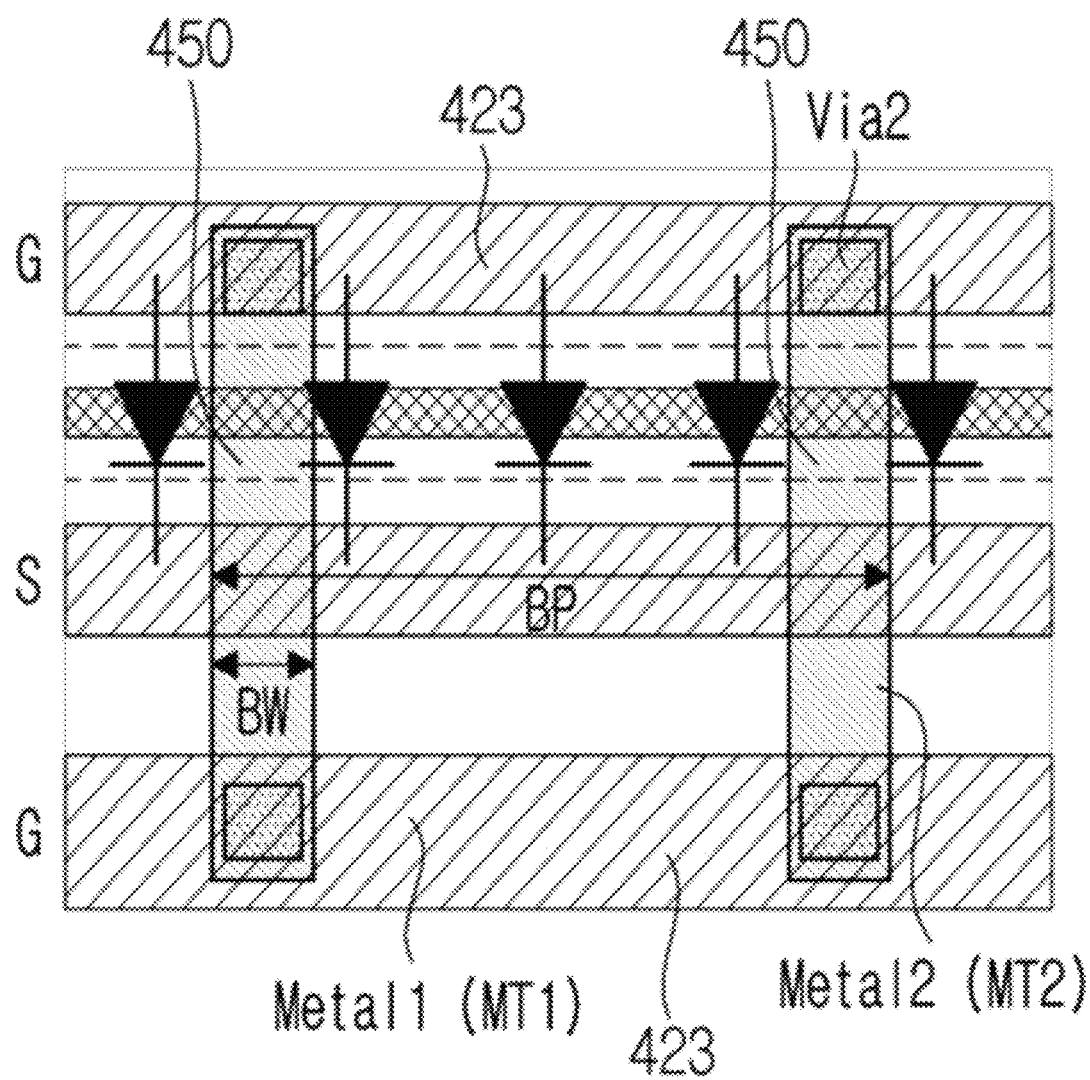
FIG. 12 is an explanatory diagram illustrating the metal bridge of FIG. 11.

FIG. 11 is a diagram illustrating the construction of a silicon photonics-based optical modulator having two metal layers, according to another embodiment of the present disclosure, and FIG. 12 is a diagram illustrating an example of a metal bridge of FIG. 11.

As illustrated in FIGS. 11 and 12, a silicon photonics-based optical modulator having two metal layers according to another embodiment of the present disclosure may include one or more metal bridges 450 formed between RF ground electrodes 423. For example, the metal bridge 450 may be formed between two RF ground electrodes 423 formed at both sides of the RF signal electrode 424 and/or between two RF ground electrodes 423 formed on both sides of the RF inverted signal electrode 425.

The metal bridge 450 is formed to have a constant width BW in the MT2 layer, and is electrically connected to the RF ground electrode 423 formed in the MT1 layer via a via-contact Via2. The metal bridges 450 may be disposed to have a predetermined spacing (=BP−BW). The same applies to the case where the RF ground electrode 423 is formed in the MT2 layer and the metal bridge 450 is formed in the MT1 layer. That is, the metal bridge 450 is formed in the MT2 layer to extend in a direction orthogonal to the RF ground electrode 423, and both ends thereof are electrically connected to the RF ground electrode 423 via the via-contact Via2.

A silicon photonics-based optical modulator having two metal layers, according to a further embodiment of the present disclosure, has advantages described due to the presence of a metal bridge 450 provided in the optical modulator.

(1) One or more metal bridges 450 may cause the RF return current supplied from the ground plane 460 through the decoupling capacitors 440 and 441 to easily flow through the entire area of the RF ground electrode 423 of the phase shifter 420.

(2) Only the capacitance of the phase shifter 420 of the optical modulator 400 can be independently controlled by adjusting the width BW of the metal bridge 450. That is, according to one embodiment of the present disclosure, in the optical modulator 400, the capacitance of the phase shifter 420 can be controlled by adjusting the width BW of the metal bridge 450. Typically, when designing the characteristic impedance of a GSGSG-shaped optical modulator, the width and distance of the signal electrode and the ground electrode are adjusted to the desired values. Since the capacitance and the inductance are changed at the same time, there is a difficulty in designing due to an increase/decrease reverse relationship.

With the use of the metal bridge 450 presented by the present disclosure, since only the capacitance of the phase shifter 420 can be independently adjusted, it is easy to design the optical modulator having the desired characteristic impedance and RF index values. When the electrodes of the phase shifter 420 are formed in the MT1 layer, the metal bridge 450 may be formed in the MT2 layer, and the MT1 layer and the MT2 layer may be connected to each other via the via-contact Via2. Since the spacing between the MT1 layer and the MT2 layer is as small as about 1 µm, it is possible to increase the capacitance of the phase shifter 420. As illustrated in FIG. 13, when the electrodes of the phase shifter 220 that is not equipped with the metal bridge 450 has a characteristic impedance of about 43Ω and an RF index of 2.75, the designed target characteristic impedance of 30Ω and the RF index of 4.0 for matching between light waves and electromagnetic waves can be achieved by increasing only the capacitance of the transmission line as indicated by the relational expressions $Z0=\sqrt{L/C}$ and $n_{RF}=c\sqrt{LC}$. In this case, the target capacitance value of the phase shifter 420 can be achieved without change in inductance by adding the metal bridge 450 and adjusting the width BW.

(3) In the phase shifter 420 of the GSGSG-driven optical modulator 400, in each of the RF signal electrode 424 and the RF inverted signal electrode 425 of the phase shifter 420, the PN-junction silicon optical waveguides 421 and 422 are connected to one of the two RF ground electrodes 423 adjacent to each other. When the RF microwave signal propagates to the asymmetric GSG transmission line, a slot mode electromagnetic wave and the desired coplanar waveguide (CPW) mode electromagnetic wave are generated, resulting in CPW mode and frequency beating. This causes a problem of a bandwidth reduction of the phase shifter 420. In the embodiment of the present disclosure, when the two RF ground electrodes 423 of the GSG structure are continuously tied using the metal bridge 450 to maintain the same potential, only the CPW mode wave that effectively propagates through a symmetric GSG transmission line can be generated. Accordingly, embodiments of the present disclosure in which the metal bridge 450 is provided can modulate high speed RF electrical signals without bandwidth reduction. In this case, the bridge period (BP) of the metal bridge 450 may be adjusted to about λ/10 or about λ/20, taking into account the center frequency of the RF electrical signal.

FIG. 14 is a diagram illustrating an example of a signal modulation verification result of a silicon photonics-based optical modulator having two metal layers according to one embodiment of the present disclosure. In order to experimentally evaluate the operation of the optical modulator, an RF electrical signal in a single-channel 100 Gbps pulse amplitude modulation (PAM) format is applied to the RF transition pad unit 410 of the optical modulator 400, and an optical signal eye diagram result of the output-side silicon optical waveguide 435 is obtained.

As illustrated in FIG. 14, according to one embodiment of the present disclosure, a silicon photonics-based optical modulator 400 having two metal layers includes an RF transition pad unit 410 having two metal layers and includes one or more metal bridges 450. As shown in the single-channel 100 Gbps optical signal eye diagram measurement result, excellent performance of the optical modulator 400 can be confirmed through the result in which each of the levels <00>, <01>, <10>, and <11> is distinct.

As described above, according to embodiments of the present disclosure, a silicon photonics-based optical modulation device having two metal layers includes an RF transition pad unit and one or more metal bridges.

The silicon photonics-based optical modulation device according to embodiments of the present disclosure can connect all RS signal transmission lines including ground lines to a driver, apply a driver DC bias voltage Vcom required for an output stage of the driver, provide an overall excellent RF frequency response characteristic by independently applying an optical modulator DC bias voltage Vpn required for the silicon photonics-based optical modulator, and be driven under voltage conditions in which characteristic impedance, RF index, modulation bandwidth, and modulation efficiency are optimized.

Although in the embodiments of the present disclosure, the phase shifter includes three ground electrodes, the present disclosure is not limited to the case where the phase shifter includes three ground electrodes. The number of ground electrodes required to implement the silicon photonics-based optical modulator may vary.

Various embodiments in the present disclosure are not intended to represent all of the possible combinations based on technical spirit of the present invention but are provided only for illustrative purposes. Elements or steps described in various embodiments can be applied independently or in combination.

Various embodiments in the present disclosure can be implemented by hardware, firmware, software, or a combination thereof. When implemented by hardware, each of the embodiments may be implemented by one or more application specific integrated circuits (ASICs), digital signal processors (DSPs), digital signal processing devices (DSPDS), programmable logic devices (PLDs), field programmable gate arrays (FPGAs), general processors, controllers, micro controllers, or micro processors.

The scope of the present disclosure covers software or machine-executable commands (for example, operating systems (OSs), application programs, firmware, programs) that enable steps in various embodiments to be performed in a certain device or computer, and a non-transitory computer-readable medium in which such software or commands are stored so as to be executable in a certain device or computer when read out.

What is claimed is:

1. A silicon photonics-based optical modulation device having two metal layers, the optical modulation device comprising:
   a phase shifter comprising a first signal electrode, a second signal electrode, and at least two ground electrodes formed in a first metal layer, the phase shifter having two silicon optical waveguides;
   a ground unit formed in a second metal layer that is different from the first metal layer, monolithically formed with the first metal layer, and electrically connected to the first metal layer by at least one conductive via; and
   a pad unit formed in the second metal layer, provided with a first local area electrically connected to the ground unit, and electrically connected to the first signal electrode and the second signal electrode via a second local area thereof electrically isolated from the ground unit, wherein the pad unit comprises:
a ground pad formed in the first local area and electrically connected to the ground unit;
a first signal pad disposed in a first region of the second metal layer electrically isolated from the ground portion;
a second signal pad disposed in a second region of the second metal layer electrically isolated from the ground unit;
a first signal transition member electrically connected to the first signal pad, formed in the first metal layer, and connected to the first signal electrode; and
a second signal transition portion electrically connected to the second signal pad, formed in the first metal layer, and connected to the second signal electrode.

2. The optical modulation device according to claim 1, wherein each of the first and second signal transition portions has a width varying along a direction of the first and second signal electrodes.

3. The optical modulation device according to claim 1, wherein each of the first signal electrode and the second signal electrode receives a first voltage that is input from a first electrode port, through a resistor connected to a terminal thereof, and provides a drive voltage of a driver electrically connected thereto, through the pad unit.

4. The optical modulation device according to claim 3, wherein one of the at least two ground electrodes receives a second voltage input through a second electrode port and applies a silicon waveguide voltage by using the second voltage and the drive voltage.

5. The optical modulation device according to claim 4, wherein the silicon optical waveguide is a PN-junction silicon optical waveguide, and the silicon optical waveguide voltage is independently adjusted by adjusting the second voltage.

6. The optical modulation device according to claim 1, wherein the ground pad is formed such that a region thereof overlapping the first signal transition portion and the second signal transition portion is adjusted to minimize RF index discontinuity and characteristic impedance of the pad unit and the phase shifter.

7. The optical modulation device according to claim 1, further comprising at least one metal bridge formed between the at least two ground electrodes.

8. The optical modulation device according to claim 7, wherein the metal bridges are formed in the second metal layer, and ends of the metal bridges are electrically connected to the respective ends of the at least two ground electrodes formed in the first metal layer through via-contacts.

9. The optical modulation device according to claim 7, wherein the phase shifter is configured such that capacitance thereof is independently adjusted by adjusting the width of the metal bridges.

10. The optical modulation device according to claim 1, further comprising a capacitor formed between the ground electrode and the ground unit.

11. The optical modulation device according to claim 1, wherein the ground pad is formed to surround at least one side surface of the first and second signal pads.

12. A silicon photonics-based optical modulation device with two metal layers, the optical modulation device comprising:

a phase shifter comprising a first signal electrode, a second signal electrode, and at least two ground electrodes formed in a first metal layer;
a pad unit formed in a second metal layer that is different from the first metal layer, monolithically formed with the first metal layer, and electrically connected to the first metal layer by at least one conductive via, wherein the pad unit is provided with a first local area electrically connected to a ground, and electrically connected to the first signal electrode and the second signal electrode via a second local area electrically isolated from the ground; and
at least one metal bridge formed between the at least two ground electrodes,
wherein the pad unit comprises:
a ground pad formed in the first local area and electrically connected to the ground;
a first signal pad disposed in a first region of the second metal layer electrically isolated from the ground pad;
a second signal pad disposed in a second region of the second metal layer electrically isolated from the ground pad;
a first signal transition portion electrically connected to the first signal pad, formed in the first metal layer, and connected to the first signal electrode; and
a second signal transition portion electrically connected to the second signal pad, formed in the first metal layer, and connected to the second signal electrode.

13. The optical modulation device according to claim 12, wherein each of the first signal electrode and the second signal electrode receives a first voltage that is input through a first electrode port, through a resistor connected to a terminal thereof, and provides a drive voltage of a driver electrically connected thereto through the pad unit, and
one of the at least two ground electrodes receives a second voltage input through a second electrode port and applies a silicon waveguide voltage by using the second voltage and the drive voltage.

14. The optical modulator according to claim 12, wherein the ground pad is formed such that a region thereof overlapping the first signal transition portion and the second signal transition portion is adjusted to minimize RF index discontinuity and characteristic impedance of the pad unit and the phase shifter.

15. The optical modulation device according to claim 12, wherein the metal bridges are formed in the second metal layer, and ends of the metal bridges are electrically connected to the respective ends of the at least two ground electrodes formed in the first metal layer through via-contacts.

16. The optical modulation device according to claim 12, wherein the phase shifter is configured such that capacitance thereof is independently adjusted by adjusting the metal bridges.

17. The optical modulator according to claim 12, further comprising a capacitor formed between the ground electrode and the ground.

18. The optical modulation device according to claim 1, wherein a first resistor is connected to an end of the first signal electrode,
a second resistor is connected to an end of the second signal electrode,
an end of the first resistor and an end of the second resistor are electrically connected to each other, and a capacitor is connected between the ends of the first and second resistors and the ground.

\* \* \* \* \*